United States Patent
George et al.

(10) Patent No.: US 12,475,026 B2
(45) Date of Patent: Nov. 18, 2025

(54) EMULATING PERFORMANCE OF PRIOR GENERATION PLATFORMS

(71) Applicant: Advanced Micro Devices, Inc., Santa Clara, CA (US)

(72) Inventors: Richard E. George, Santa Clara, CA (US); Vidyashankar Viswanathan, Boxborough, MA (US); Michael Y. Chow, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 390 days.

(21) Appl. No.: 17/564,036

(22) Filed: Dec. 28, 2021

(65) Prior Publication Data

US 2023/0205680 A1   Jun. 29, 2023

(51) Int. Cl.
*G06F 11/3668* (2025.01)
*G06F 11/34* (2006.01)

(52) U.S. Cl.
CPC ...... *G06F 11/3688* (2013.01); *G06F 11/3457* (2013.01); *G06F 11/3684* (2013.01); *G06F 11/3692* (2013.01)

(58) Field of Classification Search
CPC ............ G06F 11/3457; G06F 11/3684; G06F 11/3688; G06F 11/3692; G06F 11/3409; G06F 11/3428; G06F 9/455
USPC ............................................. 717/124; 703/23
See application file for complete search history.

(56) References Cited

U.S. PATENT DOCUMENTS

| | | | | |
|---|---|---|---|---|
| 4,084,235 A | * | 4/1978 | Hirtle | G06F 9/45533 703/26 |
| 5,919,268 A | * | 7/1999 | McDonald | G06F 11/3409 714/47.1 |
| 6,389,379 B1 | * | 5/2002 | Lin et al. | G06F 30/33 703/23 |
| 9,846,587 B1 | * | 12/2017 | Schumacher | G06F 9/455 |
| 2002/0026302 A1 | * | 2/2002 | Takeda | G06F 11/3688 703/19 |
| 2004/0015600 A1 | | 1/2004 | Tiwary et al. | |
| 2004/0059562 A1 | * | 3/2004 | Bergman et al. | G06F 9/455 703/23 |
| 2008/0172661 A1 | | 7/2008 | Chatterjee et al. | |
| 2013/0095922 A1 | * | 4/2013 | Link | A63F 13/54 463/31 |
| 2014/0359269 A1 | | 12/2014 | Moen et al. | |
| 2015/0120267 A1 | * | 4/2015 | Petit et al. | G06F 11/3692 703/13 |
| 2018/0246558 A1 | | 8/2018 | Morad | |
| 2019/0369969 A1 | * | 12/2019 | Donohoe et al. | G06F 9/455 |
| 2023/0135825 A1 | * | 5/2023 | Surisetty et al. | G06F 11/3409 714/47.2 |

(Continued)

FOREIGN PATENT DOCUMENTS

| | | | | |
|---|---|---|---|---|
| CN | 110618944 A | * | 12/2019 | G06F 11/3672 |
| CN | 117850552 A | * | 4/2024 | G06F 9/4893 |

*Primary Examiner* — Phillip H Nguyen
(74) *Attorney, Agent, or Firm* — Volpe Koenig

(57) ABSTRACT

Methods and systems are disclosed for emulating, in a platform, the performance of a target platform. Techniques disclosed include receiving, by the platform, values of system features, associated with a target performance of the target platform; and setting, by the platform, one or more configuration knobs, based on the received values of system features, to match a performance of the platform to the target performance of the target platform.

20 Claims, 4 Drawing Sheets

(56) References Cited

U.S. PATENT DOCUMENTS

2023/0153218 A1\* 5/2023 Ganapathy et al. ......................... G06F 11/3409
712/30

\* cited by examiner

100

200

300

400

EMULATING PERFORMANCE OF PRIOR GENERATION PLATFORMS

BACKGROUND

A realtime and interactive application, such as a computer game, is typically designed and optimized for specific generation platform. The binary code of such an application, generally, cannot run successfully on a newer generation platform without porting the code to the new platform, including modifying the source code and compiling the modified source code for the new platform. Due to the complexity of computer games, porting their codes from one generation platform to another is costly and time consuming. Therefore, binary-level backward compatibility across platform generations is needed.

BRIEF DESCRIPTION OF THE DRAWINGS

A more detailed understanding may be had from the following description, given by way of example in conjunction with the accompanying drawings wherein.

DETAILED DESCRIPTION

Figure 1:
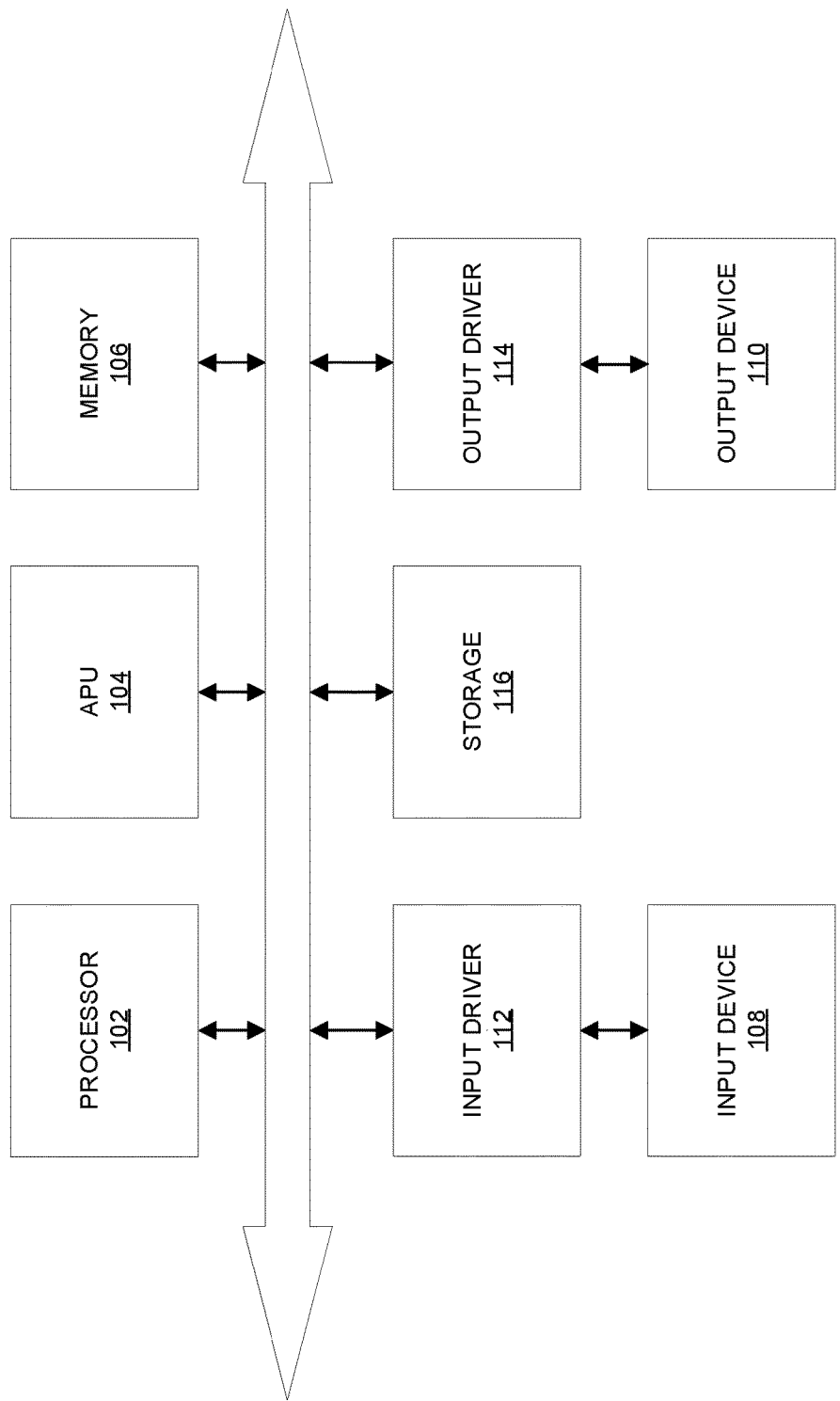
FIG. 1 is a block diagram of an example device, based on which one or more features of the disclosure can be implemented.

Systems and methods are disclosed for emulating, by a new generation platform, the performance of an old generation platform. The new generation platform is configured to operate in a native (normal) mode of operation and a foreign mode of operation. In the latter, the platform emulates the performance of a target platform (e.g., an old generation platform). Emulating the performance of a target platform is achieved by programmable configuration knobs (registers) that are integrated into the circuitry of system components of the platform. Thus, when the platform detects that a binary-code (launched for execution on the platform) is compiled for the target platform, the platform, in a foreign mode of operation, sets knobs that configure the platform's architecture and operation so that the platform performance matches the performance of the target platform.

Aspects of the present disclosure describe methods for emulating, in a platform, the performance of a target platform. The methods comprise: receiving, by the platform, values of system features, associated with a target performance of the target platform; and setting, by the platform, based on the received values of system features, one or more configuration knobs to match a performance of the platform to the target performance of the target platform. In an aspect, before receiving values of system features, the methods further comprise measuring the values of the system features by executing a diagnostic test on the target platform. The diagnostic test is associated with a binary-code of an application that is compiled for the target platform. In another aspect, before the setting of one or more configuration knobs, the methods further comprise: detecting, by the platform, that a binary-code, launched for execution on the platform, is compiled for the target platform; and switching, by the platform, from a native mode of operation to a foreign mode of operation. Wherein in the foreign mode of operation the platform emulates the target performance of the target platform based on the setting of the one or more configuration knobs.

Aspects of the present disclosure also describe a platform for emulating the performance of a target platform, comprising at least one processor and memory storing instructions. The instructions, when executed by the at least one processor, can cause the processor to: receive, by the platform, values of system features, associated with a target performance of the target platform, and set, by the platform, based on the received values of system features, one or more configuration knobs to match a performance of the platform to the target performance of the target platform.

Further, aspects of the present disclosure describe a non-transitory computer-readable medium comprising instructions executable by at least one processor to perform methods for emulating, in a platform, the performance of a target platform. The methods comprise: receiving, by the platform, values of system features, associated with a target performance of the target platform; and setting, by the platform, based on the received values of system features, one or more configuration knobs to match a performance of the platform to the target performance of the target platform.

FIG. 1 is a block diagram of an example device 100, based on which one or more features of the disclosure can be implemented. The device 100 can be, for example, a computer, a gaming device, a handheld device, a set-top box, a television, a mobile phone, or a tablet computer. The device 100 includes a processor 102, an accelerated processing unit (APU) 104, memory 106, storage 116, an input device 108, and an output device 110. The device 100 can also include an input driver 112 and an output driver 114. In an aspect, the device 100 can include additional components not shown in FIG. 1.

The processor 102 can include a central processing unit (CPU) or one or more cores of CPUs. The APU 104 can represent a highly parallel processing unit, a graphics processing unit (GPU), or a combination thereof. The processor 102 and the APU 104 may be located on the same die or on separate dies. The memory 106 can be located on the same die as the processor 102, or can be located separately from the processor 102. The memory 106 can include volatile or non-volatile memory, for example, random access memory (RAM), dynamic RAM (DRAM), a cache, or a combination thereof.

The storage 116 can include fixed or removable storage, for example, a hard disk drive, a solid-state drive, an optical disk, or a flash drive. The input device 108 can represent one or more input devices, such as a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 110 can represent one or more output devices, such as a display, a speaker, a printer, a haptic feedback device, one or more lights, an antenna, or a network connection (e.g., a wireless local area network card for transmission of wireless IEEE 802 signals).

The input driver 112 communicates with the processor 102 and the input device 108, and facilitates the receiving of input from the input device 108 to the processor 102. The output driver 114 communicates with the processor 102 and the output device 110, and facilitates the sending of output from the processor 102 to the output device 110. In an aspect, the input driver 112 and the output driver 114 are optional components, and the device 100 can operate in the same manner when the input driver 112 and the output driver 114 are not present.

The APU 104 can be configured to accept compute (dispatch) commands and graphics (draw) commands from processor 102, to process those compute and graphics rendering commands, and/or to provide output to a display (output device 110). As described in further detail below, the APU 104 can include one or more parallel processing units configured to perform computations, for example, in accordance with a single instruction multiple data (SIMD) paradigm. A SIMD paradigm is one in which the same one or more instructions (associated with a computational task) are applied in parallel to different data elements.

Figure 2:
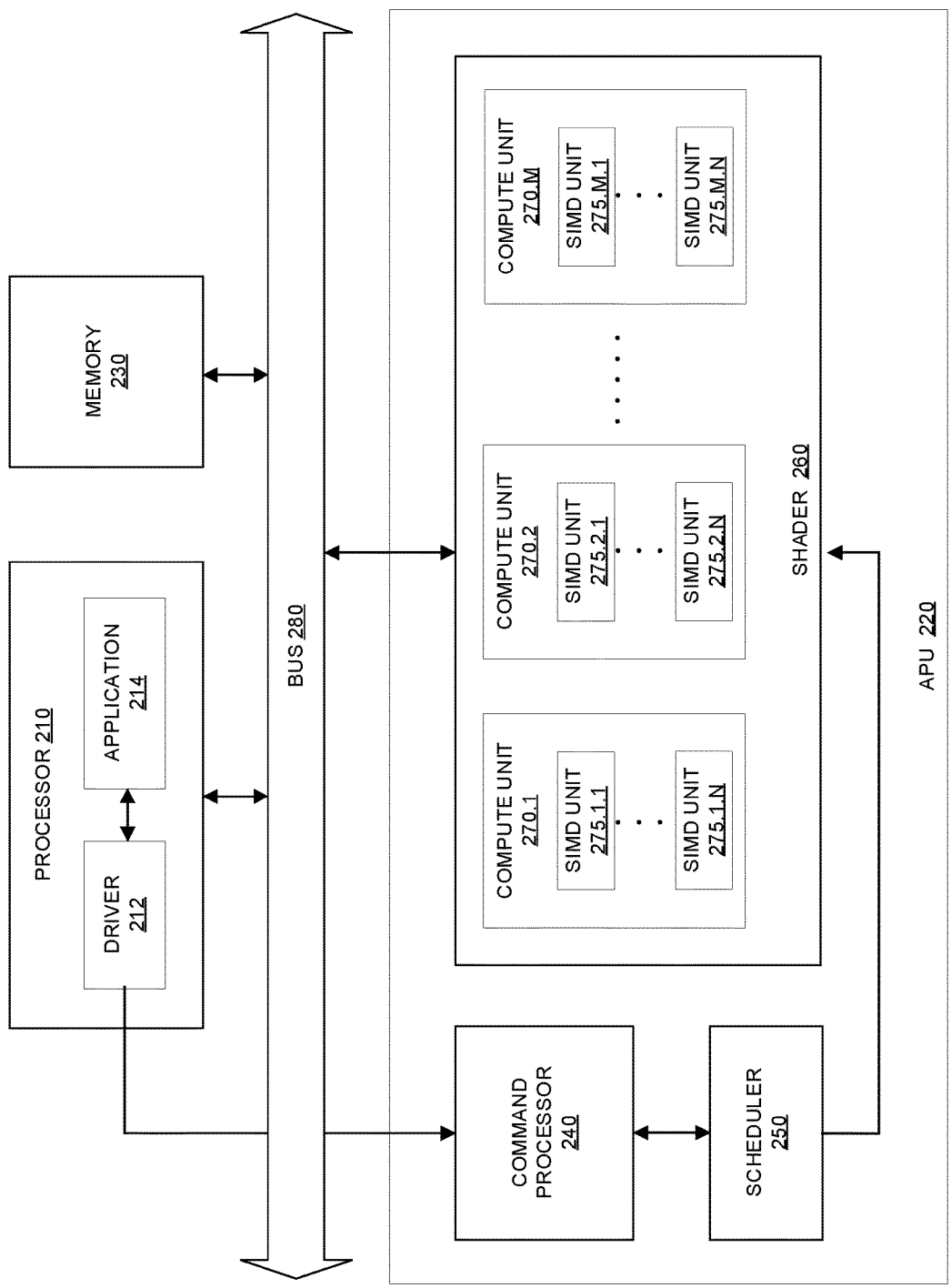
FIG. 2 is a block diagram of an example system for accelerated processing, based on which one or more features of the disclosure can be implemented.

FIG. 2 is a block diagram of an example system 200 for accelerated processing, based on which one or more features of the disclosure can be implemented. The system 200 includes a processor 210 (e.g., the processor 102 of FIG. 1), an APU 220 (e.g., the APU 104 of FIG. 1), and memory 230 (e.g., the memory 106 of FIG. 1). The processor 210, the APU 220, and the memory 230 are communicatively connected via communication links of the system 200, for example, the bus 280 shown in FIG. 2. The APU 220 includes a command processor 240, a shader scheduler 250, and a shader 260. The processor 210 is configured to execute software modules, such as a user application 214 and a driver 212, through which the application 214 can interface with the command processor 240. Thus, an application 214, such as a computer game or a simulator, may use an application programming interface (API) provided by the driver 212, to send commands to the command processor 240 that specify computational tasks to be performed by the shader 260. Generally, the driver 212 packs such commands together with metadata (e.g., configuration information) in command packets in accordance with a packet format, stores the command packets in memory 230, and, then, alerts the command processor 240 that new command packets are awaiting in memory 230 to be fetched and processed.

The command processor 240 is configured to provide an interface between software modules running on the processor 210 and the shader 260. The command processor 240, when alerted by the driver 212, fetches new command packets from memory 230. Based on the metadata (stored in each packet's header) the command processor sets configuration registers and based on the nature of the commands (stored in each packet) the command processor 240 distributes the processing of these commands, for example, to dedicated components within the command processor 240. Thus, typically, graphics commands are processed by graphics command processors and compute commands are processed by compute command processors. The graphics command processors and the compute command processors are each configured to process their respective commands to generate corresponding shader computational tasks, and, then, to queue these tasks into respective execution queues.

The scheduler 250 is configured to schedule the shader's 260 resources to perform the computational tasks that are queued in the execution queues. To that end, the scheduler 250 assigns the tasks to compute units 270.1-M in the shader 260 based on their availability. Each compute unit, e.g., 270.1, can have one or more SIMD units, e.g., 275.1.1-N, that can perform operations in parallel according to a SIMD paradigm. For example, each SIMD unit, e.g., 275.1.1, can run 64 lanes (i.e., threads), where each lane executes the same instruction at the same time as the other lanes in the SIMD unit, but executes that instruction on different data elements. In an aspect, each of the compute units 270.1-M can have a local cache and/or multiple compute units can share a cache or a hierarchy of caches.

The basic unit of execution in a compute unit, e.g., 270.1, is a work-item. Typically, work-items represent program instantiations that can be executed in parallel in respective lanes. Thus, work-items can be executed simultaneously as a "wavefront" (or a "wave") on a single SIMD, e.g., 275.1.1. One or more waves can be run in a workgroup, each wave including a collection of work-items designated to execute the same program. A workgroup is executed by executing each of the waves that make up the workgroup. The waves can also be executed sequentially on a single SIMD unit or partially or fully in parallel on different SIMD units, 275.1-N. Thus, a wave can be thought of as a collection of work-items that can be executed simultaneously on a single SIMD unit e.g., 275.1.1. However, if commands of a program received from the processor 210 require a degree of parallelism that cannot be achieved by a single SIMD unit, then the commands can be executed by waves that can be parallelized on two or more SIMD units (e.g., 275.1.1-N), serialized on the same SIMD unit (e.g., 275.1.1.), or both parallelized and serialized as needed.

Hence, the scheduler 250 can be configured to perform operations related to launching various waves on the different compute units 270.1-M and their respective SIMD units 275. The parallelism afforded by the compute units 270.1-M is suitable, for example, for operations that can be parallelized, such as operations on multi-dimensional data (e.g., image processing), operations on geometrical data (e.g., vertex spatial transformations and rendering), and other parallel computations. For example, an application 214, executing on the processor 210, can involve computations to be performed by the APU 220. As mentioned above, the application 214 can use APIs provided by the driver 212 to issue commands to the command processor 240 of the APU 220. The command processor 240 then translates the issued commands into computational tasks that are scheduled, by the scheduler 250, for execution by the compute units 270.1-M. For example, the command processor 240 may receive a command that includes an instruction to be perform on data (e.g., 1024 pixels of an image). In response, the command processor 240 may chunk the data into data elements (each containing the data required for the processing of part of the data, e.g., an 8×8 pixel block) and generate respective shader tasks to process the data elements. The scheduler 250 may then assign the shader tasks to one or more available compute units 270. Each compute unit may then launch one or more waves, each of which will execute (in multiple parallel lanes) shader tasks associated with respective data elements.

The systems 100, 200 described above in reference to FIG. 1 and FIG. 2 may represent platforms of various generations. For example, the platforms may be game consoles used to execute computer games. The system architecture of a platform and the technologies based on which the circuitry of the platform have been designed and built vary across platform generations. Naturally, a newer generation platform is advanced relative to an older generation platform. For example, a new platform may be able to operate at a higher frequency, and, therefore, may run faster than an old platform when a workload requires it (and may operate at a lower frequency when the workload can tolerate it to save power consumption). A new platform may have a more flexible architecture, and, therefore, may provide more opportunities to globally optimize the system operations, resulting in, for example, increased efficiency in memory access. A new platform may have more computing and storage resources, and, thereby, higher processing capacity. In spite of the many benefits of replacing an old platform with a new platform, adopting a new platform raises issues of backward compatibilities.

Realtime applications, such as interactive computer games, are typically designed to generate rapidly changing content, involving high motion video rendering. To provide the user with an immersive experience and high-quality imagery, such applications execute inter-dependent multi-threaded modules that are time sensitive. Such modules are optimized and tuned for the platform they are designed and compiled for. Thus, an application that was designed and complied for an old platform may not be able to seamlessly run on a new platform. In fact, when the application's binary code is executed as-is on the new platform, in the worst case, the application will crash, and in the best case, the application will not behave as designed and the user's immersive experience may be compromised. The straightforward solution is to recompile the source code of the application for the new platform. Yet, since the application was designed based on the system characteristics of the old platform, the new compilation may not properly execute on the new platform without any further changes to the source code. As disclosed herein, another solution is to emulate the performance of the old platform—that is, the target platform—on the new platform, so that when executing the binary code (that is designed and compiled for a target platform), as-is, on the new platform it will be executed properly and in a manner that is indistinguishable from a user's perspective.

To emulate the performance of a target platform (e.g., an old generation platform) on a platform (e.g., a new generation platform), the platform is configured to operate in multiple operation modes—a native mode of operation and a foreign mode of operation. In a native (normal) mode of operation, the platform operates as designed for that platform. In a foreign mode of operation, the platform emulates the performance of another (target) platform. To that end, the platform is configured to respond to various configuration knobs that affect the performance of the platform. Configuration knobs, as referred to herein, are programmable registers that limit (or throttle) features of the system that affect the system's performance. These configuration knobs can be control registers that are integrated into various system components of the platform (e.g., the processor 210, the APU 220, and the bus 280 of FIG. 2) and that control features that affect the performance of these components. In a foreign mode of operation, thus, the configuration knobs can be used to tune the performance of the platform to match the performance of a target platform.

In an aspect, the performance of a target platform can be measured by diagnostic (or synthetic) tests, associated with the binary-code of an application for which binary-level backward compatibility is desired. The diagnostic tests can be executed on the target platform that the application is designed and compiled for. Based on these diagnostic tests, performance related system features of the target platform can be measured. In turn, the configuration knobs of the platform can be set based on the measured system features of the target platform to tune the performance of the platform to a target performance of the target platform. In this manner, binary-level backward compatibility can be achieved, as disclosed herein, by setting configuration knobs that are integrated into circuitry of various system components of the platform.

Performance features associated with memory access in a platform can be adjusted to emulate memory access related performance in a target platform. Various configuration knobs can be designed to throttle (slow down) access to memory in the platform so that it will match the speed in which memory is accessed in the target platform, as further discussed in referenced to FIG. 3

Figure 3:
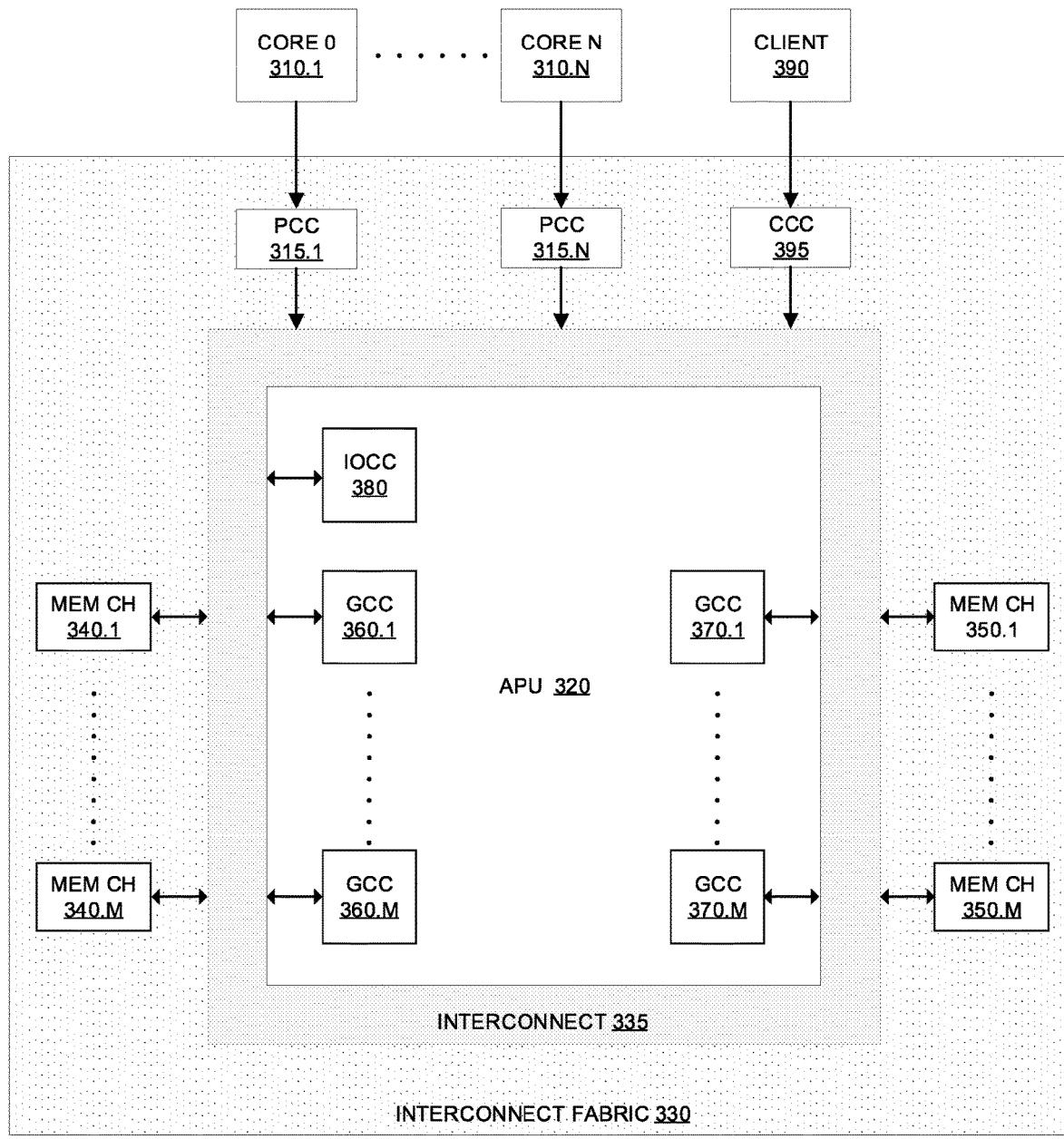
FIG. 3 is a functional block diagram of an example system, demonstrating throttling of an interconnect fabric, based on which one or more features of the disclosure can be implemented.

FIG. 3 is a functional block diagram of an example system 300, demonstrating throttling of an interconnect fabric, based on which one or more features of the disclosure can be implemented. The system 300 includes clients—such as processor cores 310.1-N, an APU (or a cluster of APUs) 320, and any one of other clients 390 (e.g., drivers 112, 114 or input/output devices 108, 110)—that require access to memory via an interconnect fabric 330. The interconnect fabric 330 includes an interconnect 335, channel controllers 315.1-N, 360.1-M, 370.1-M, 380, 395, and memory channels 340.1-M and 350.1-M. The interconnect 335 facilitates connection via multiple switchers (not shown) between the clients and the memory channels. A client, e.g., a core client 310.1, can issue a request to access memory at a memory address via its respective channel controller in the interconnect fabric, e.g., 315.1. Based on the memory address, a connection will be provided by the switchers of the interconnect 335. As illustrated in FIG. 3, processor cores 310.1-N are connected to the interconnect 335 via respective processor channel controllers (PCCs) 315.1-N. APU's 320 components (e.g., compute unit 270.1-M) are connected to the interconnect 335 via respective graphics channel controllers (GCCs), 360.1-M and 370.1-M. Likewise, any other client 390 can be connected to the interconnect 335 via a respective client channel controller (CCC) 395. Thus, the interconnect 335, via its multiple switchers can connect the cores 310.1-N, the APU's 320 components, and any other client 390 to one of the memory channels, 340.1-M and 350.1-M, and, thereby, to memory.

To emulate the performance of a target platform in the platform 300 illustrated in FIG. 3, the channel controllers are configured to throttle the bandwidth of the interconnect fabric to match the bandwidth of the target platform. To that end, three mechanisms, or throttling modes, are disclosed herein: a coarse grain throttling mode; a fine grain throttling mode; and a limited outstanding request number mode. In a coarse grain throttling mode, for example, only one request for memory access can be made by a client of the interconnect fabric during T number of clock cycles. In a fine grain throttling mode, for example, Q number of requests for memory access can be made by a client of the interconnect fabric every T number of clock cycles. In a limited outstanding request number mode, the maximum number of outstanding requests is constrained. These throttling mechanisms can be employed by each of the channel controllers with respect to requests to access the memory made by their respective clients. Such throttling can be used to decrease the bandwidth of the interconnect fabric 330 to match the bandwidth of the target platform. The throttling mode that is used and the degree of throttling can be determined by respective configuration knobs that can be integrated into the channel controllers' circuitry.

In an aspect, a platform can be architected to include one or more communication pipes that connect the APU 320 to memory. For example, in a target platform a split bus may be employed, including one communication pipe that is designed for ordered traffic and another communication pipe that is designed for unordered traffic. Typically, a communication pipe that is designed to carry unordered traffic can be more efficient (in terms of bandwidth and latency) as it is free of the constraint of sending packets in their order of arrival. Thus, a new platform 300 has a unified bus architecture, including communication pipes that are designed for only unordered traffic. To match the target performance of a target platform with a split bus architecture, an IO channel controller (IOCC) 380 can be configured to provide ordered traffic. Accordingly, when operating in a foreign mode, traffic that is intended (in the target platform) to be exchanged between the APU and memory in an ordered manner will be sent through an ordered communication pipe emulated by the IOCC 380. For example, in the target platform, a component of the APU that performs graphics-related computations may require un-ordered traffic, while a component of the APU that performs no graphics-related computations may require ordered traffic. Thus, an APU may mark a packet to indicate whether it should be sent in an ordered or an unordered manner. Based on such markings, a configuration knob associated with the IOCC 380 can be set to emulate ordered traffic in addition to the unorder traffic (that is, to emulate a split bus).

The performance of the processor cores 310.1-N in the platform 300 can also be adjusted to emulate the performance of processor cores in the target platform. To achieve functional backward compatibility, instruction machine codes can be designed so that they are back compatible— that is, operation codes (opcodes) can be developed for cores 310.1-N in the platform 300 that accommodate the format of respective opcodes developed for the target platform. To achieve backward compatibility with respect to the performance of the cores 310.1-N, the cores have to be programmatically configured to match their performance to the performance of the cores in the target platform. Typically, such configuration slows the operation of the cores 310.1-N in the platform 300 to a level that matches the speed of operation of the cores in the target platform. Tuning the performance of the cores 310.1-N can be done by setting configuration knobs. As mentioned above, a knob is a programmable register that limits (or throttles) a feature of the system that affects the system's performance. For example, a knob that controls the number of instructions a core tracks (that is, the number of instructions that pass through the processing pipelines) can be set to equal that of the target platform. In another example, knobs can limit the sizes of respective internal queues in a core in the platform 300 to match them with the sizes of corresponding queues in a core in the target platform. Such configuration knobs (that are integrated into the circuitry of the cores 310.1-N) can be set when the platform 300 operates in a foreign mode to emulate performance of cores in a target platform within a range of tolerance. Hence, emulating involves manipulating the architecture of the cores to reduce their overall performance so that the cores behave like the cores of a target platform (e.g., a previous generation platform).

In an aspect, configuration knobs, designed to configure a cache system that a core utilizes, can be set to tune the performance of the core with respect to the cache system utilization. For example, instruction cache (IC) associativity can be configured by a knob that sets the IC cache to perform direct mapping or to reduce the number n of an n-way set associative cache. Likewise, a knob can disable a certain way, and, thereby, control which way in a cache can be replaced. Additionally, a knob can control the cache size. In another example, the data cache (DC) can be configured by respective knobs. For example, knobs can control the behavior of various prefetchers and other predictors in L1 or L2 caches; such control may be by limiting the rate of prefetchers or disabling the prefetcher or predictors entirely. Further, a knob that controls the size of L3 cache can be set. A knob can also reduce the number of entries of a miss information buffer (MIB) that keeps track of pending L2 to L3 requests.

In an aspect, knobs can configure circuitry in the cores that are associated with instructions' fetching and branch prediction to tune the performance of these cores. For example, a knob can control the number of prefetching into an instruction cache (or disable the prefetching). In another example, a knob can disable a recent predictor. A recent predictor is active when the entries of a branch target buffer (BTB) are predicted as taken branches; using this predictor can be useful in case of repeated looping patterns. Likewise, a knob can control the size of the branch prediction queue (BPQ). Additionally, the associativity of a cache (e.g., L1 or L2 cache associated with the BTB) can be tuned by, for example, a knob that configures the cache to perform direct mapping or reduces the number n in an n-way set associative cache.

In an aspect, knobs can configure circuitry in the cores that are related to the load store (LS) to tune the performance of these cores. A knob can control the size of an out-of-order buffer (GOB). The GOB holds all the completed loads picked by a load queue (LQ) out-of-order with respect to older stores that are waiting for valid linear address. A knob can also control the size of the LOQ. The LOQ holds completed cacheable loads which are executed out-of-order. If an LOQ is full, the LS does not pick out-of-order loads for execution. A knob can control the size of an L1 Miss Queue (L1MQ) that holds requests to the L2 cache.

In an aspect, knobs can configure the circuitry in the cores that are associated with instruction decoding (DE), to tune the performance of these cores. For example, a knob can be set to disable the opcode cache (OC). When an OC is disabled, fetch requests cannot be served from the OC to the decode pipeline. Instead, fetch requests are served from the IC. A knob can restrict dispatch, for example, to limit reading to a maximum of two MicroOps from opcode cache. A knob can disable other branch and memory access optimizations. A knob can control the size of a retire queue that is responsible for keeping track of the program order between dispatch and retirement. A knob can control the size of a physical register file free list. Knobs can control the sizes of queues, such as an ALU (Arithmetic Logic Unit) scheduling queue (that holds arithmetic logic operations to be executed in an ALU), an AGU (Address Generation Unit) scheduling queue (that holds address generation operations to be executed in an AGU), a branch buffer queue (that tracks the register instruction pointer of taken branches), a load queue (that holds all incomplete loads and picks them to flow down the pipes as needed), a store queue (that tracks stores from dispatch until commitment), and a floating-point scheduler queue, among other queues.

The computing resources of the APU 320 in the platform 300 can be adjusted to emulate the computing resources available in the APU of the target platform. For example, the clock frequency at which the APU 320 operates can be reduced to slow down the processing, so that its speed matches the processing speed of the APU of the target platform. In addition, or alternatively, the number of computing resources in the APU 320 can be reduced, such as the maximum number of compute unit that can be used, the maximum number of waves that can be launched on each compute unit, and/or the maximum number of lines in a wave. Further, the rates in which geometrical elements are issued in the APU 320 can be limited to match respective rates in the APU of the target platform. For example, the rates at which vertices, primitives, and tessellators are processed or generated may be reduced by half.

Applications that are designed to run on a particular platform rely on that platform's floating-point precision. Specifically, computations that are performed by arithmetic logic units (ALUs) that are integrated into the SIMDs of the APU 320 provide results with characteristic floating-point precision. When running a binary code of an application that is designed based on the floating-point precision afforded by a target platform on platform 300 with a different floating-point precision, the outcome (e.g., content rendered) may be different. Such a difference may be distinguishable by a viewer (color and position of graphics) and may impair the viewer's experience when interacting with the application (e.g., computer game). Hence, when in a foreign mode, the platform 300 has to emulate the floating-point precision of the target platform. To that end, circuitry in the ALUs of the APU 320 has to support multiple levels of precision. Knobs can programmatically configure circuitry in the ALUs to tune their floating-point precision (e.g., by controlling the order in which data is truncated and computed). Thus, configuration knobs can configure the ALUs of the APU 320 to perform operations in computational steps and manners that will result in a floating-point precision that matches that of the target platform.

Figure 4:
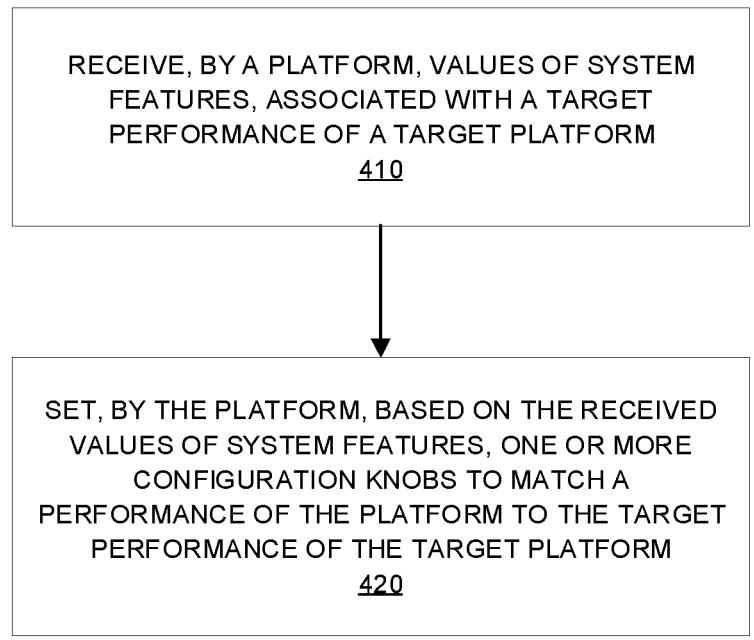
FIG. 4 is a flowchart of an example method for emulating target performance, based on which one or more features of the disclosure can be implemented.

FIG. 4 is a flowchart of an example method 400 for emulating a target performance, based on which one or more features of the disclosure can be implemented. The method 400 emulates, in a platform, the performance of a target platform. The method 400 begins with step 410, where values of system features are received by the platform. The system features are associated with a target performance of the target platform. Then, in step 420, one or more configuration knobs are set, based on the received values of system features, to match a performance of the platform to the target performance of the target platform. In an aspect, prior to receiving the values of system features, the method 400 includes a step of measuring the values of the system features by executing a diagnostic test on the target platform. The diagnostic test is associated with a binary-code of an application that is compiled for the target platform. In another aspect, prior to the setting of one or more configuration knobs, the method 400 include a step of detecting that a binary-code, launched for execution on the platform, is compiled for the target platform and a step of switching from a native mode of operation to a foreign mode of operation. Where in a foreign mode of operation the platform emulates the target performance of the target platform based on the setting of the one or more configuration knobs.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for emulating, in a platform, performance of a target platform, comprising:
   receiving, by the platform, values of system features, associated with a target performance of the target platform;
   detecting, by the platform, that code for an application is compiled for the target platform prior to executing the application;
   switching, by the platform, from a native mode of operation to a foreign mode of operation based on the detecting, the switching comprising setting based on the received values of system features, one or more configuration knobs to match a performance of the platform to the target performance of the target platform; and
   executing, by the platform, the application in the foreign mode of operation, wherein the executing emulates the target performance of the target platform.

2. The method of claim 1, before the receiving, further comprising:
   measuring the values of the system features by executing a diagnostic test on the target platform, the diagnostic test is associated with an application that is compiled for the target platform.

3. The method of claim 1, wherein the setting of the one or more configuration knobs comprises:
   throttling a bandwidth of memory access in the platform to match the throttled bandwidth to a bandwidth of memory access in the target platform.

4. The method of claim 3, wherein the throttling is according to a coarse grain throttling mode, wherein one request for memory access can be made during T number of clock cycles.

5. The method of claim 3, wherein the throttling is according to a fine grain throttling mode, wherein Q number of requests for memory access can be made every T number of clock cycles.

6. The method of claim 3, wherein the throttling is according to a limited outstanding request number mode, wherein a number of outstanding requests is constrained to a maximum number.

7. The method of claim 1, further comprising:
   emulating a split bus architecture, wherein the setting of the one or more configuration knobs comprises enabling ordered traffic and unordered traffic to memory.

8. The method of claim 1, wherein the setting of the one or more configuration knobs comprises:

configuring circuitry, in a processor core of the platform, associated with a cache system to match the performance of the processor core to the performance of a core of the target platform.

9. The method of claim 1, wherein the setting of the one or more configuration knobs comprises:
configuring circuitry, in a processor core of the platform, associated with processing instructions to match the performance of the processor core to the performance of a core of the target platform.

10. The method of claim 1, wherein the setting of the one or more configuration knobs comprises:
configuring computing resources of an accelerated processing unit (APU) of the platform to match the performance of the APU to the performance of an APU of the target platform.

11. The method of claim 10, wherein the configuring the computing resources of the APU comprises determining an issue rate of geometrical elements.

12. The method of claim 1, wherein the setting of the one or more configuration knobs comprises:
configuring floating-point precision of arithmetic logic units in an accelerated processing unit (APU) of the platform to match the floating-point precision of the arithmetic logic units in an APU of the target platform.

13. The method of claim 1, wherein the code is binary code for the application.

14. A platform for emulating performance of a target platform, comprising:
at least one processor; and
memory storing instructions that, when executed by the at least one processor, cause the processor to:
receive, by the platform, values of system features, associated with a target performance of the target platform;
detect, by the platform, that code for an application is compiled for the target platform prior to executing the application;
switch, by the platform, from a native mode of operation to a foreign mode of operation based on the detecting, the switch including setting, based on the received values of system features, one or more configuration knobs to match a performance of the platform to the target performance of the target platform; and
execute, by the platform, the application in the foreign mode of operation, wherein the platform emulates the target performance of the target platform.

15. The platform of claim 14, wherein, before the values of the system features are received, the instructions further cause the processor to:
measure values of the system features by executing a diagnostic test on the target platform, the diagnostic test is associated with an application that is compiled for the target platform.

16. The platform of claim 14, wherein the setting of the one or more configuration knobs comprises:
throttling a bandwidth of memory access in the platform to match the throttled bandwidth to a bandwidth of memory access in the target platform.

17. The platform of claim 14, wherein the setting of the one or more configuration knobs comprises:
configuring circuitry, in a processor core of the platform, associated with a cache system or processing instructions to match the performance of the processor core to the performance of a core of the target platform.

18. The platform of claim 14, wherein the setting of the one or more configuration knobs comprises:
configuring computing resources of an accelerated processing unit (APU) of the platform to match the performance of the APU to the performance of an APU of the target platform.

19. A non-transitory computer-readable medium comprising instructions executable by at least one processor to perform a method for emulating, in a platform, the performance of a target platform, the method comprising:
receiving, by the platform, values of system features, associated with a target performance of the target platform;
detecting, by the platform, that code for an application is compiled for the target platform prior to executing the application;
switching, by the platform, from a native mode of operation to a foreign mode of operation based on the detecting, the switching comprising setting based on the received values of system features, one or more configuration knobs to match a performance of the platform to the target performance of the target platform; and
executing, by the platform, the application in the foreign mode of operation, wherein the executing emulates the target performance of the target platform.

20. The platform of claim 14, wherein the code is binary code for the application.

* * * * *